United States Patent [19]

Bornstein et al.

[11] 4,064,296

[45] Dec. 20, 1977

[54] HEAT SHRINKABLE MULTI-LAYER FILM OF HYDROLYZED ETHYLENE VINYL ACETATE AND A CROSS-LINKED OLEFIN POLYMER

[75] Inventors: Norman D. Bornstein, Spartanburg; Donald J. d'Entremont; Alan S. Weinberg, both of Greenville; Henry G. Schirmer; Joseph Zu Sun, both of Spartanburg, all of S.C.

[73] Assignee: W. R. Grace & Co., Duncan, S.C.

[21] Appl. No.: 618,876

[22] Filed: Oct. 2, 1975

[51] Int. Cl.² .................... B65D 11/00; B65D 35/00
[52] U.S. Cl. ..................................... 428/35; 428/515; 428/36; 428/516; 428/520; 428/522; 156/229; 156/244; 427/385 B; 427/36; 264/181
[58] Field of Search ............. 428/35, 36, 515, 516, 428/530, 522

[56] References Cited

U.S. PATENT DOCUMENTS

| | | | |
|---|---|---|---|
| 2,543,229 | 2/1951 | Chapman | 428/516 X |
| 3,285,766 | 11/1966 | Barkis et al. | 428/516 X |
| 3,519,531 | 7/1970 | James et al. | 428/516 |
| 3,595,740 | 7/1971 | Gerow | 428/349 |
| 3,741,253 | 6/1973 | Brax et al. | 428/215X |
| 3,817,821 | 6/1974 | Gallini | 428/516 X |
| 3,932,692 | 1/1976 | Hirata et al. | 428/35 X |

*Primary Examiner*—P. C. Ives
*Attorney, Agent, or Firm*—John J. Toney; William D. Lee, Jr.; John B. Hardaway

[57] ABSTRACT

A heat shrinkable multi-layer packaging film having a layer of a hydrolyzed ethylene-vinyl acetate copolymer. Preferably, the film is formed by coextruding the hydrolyzed ethylene-vinyl acetate copolymer layer between two other polymeric layers, at least one of which is cross-linkable, and thereafter irradiating and orienting the multi-layer structure. The resulting film is heat shrinkable and has very low oxygen permeability.

14 Claims, No Drawings

HEAT SHRINKABLE MULTI-LAYER FILM OF HYDROLYZED ETHYLENE VINYL ACETATE AND A CROSS-LINKED OLEFIN POLYMER

FIELD OF THE INVENTION

This invention relates to a novel heat shrinkable film having low oxygen permeability and which is particularly suitable for packaging foodstuffs including meat and cheese. Specifically, the invention relates to a heat shrinkable multi-layer film having a hydrolyzed ethylene-vinyl acetate copolymer layer.

As used herein, the hydrolyzed ethylene-vinyl acetate copolymer will be referred to as "HEVA".

BACKGROUND OF THE INVENTION

Thermoplastic packaging films can be broadly grouped into two categories, one being rigid or semi-rigid films and the other being flexible films. The semi-rigid and rigid films are quite suitable for applications which require a thermoforming operation to form the film into a more or less fixed, self-supporting shape. Typically such films are used in blister packaging, skin packaging, and shallow tray forming for packaging luncheon meat and the like. In addition to being thermoformable, it is often desirable that a semi-rigid film be heat sealable and have a low oxygen permeability in order to oxygen from reaching oxygen sensitive food products. However, it is indeed rare that all of these desirable attributes will be found in a single layer of polymeric film so that in practice the desirable characteristics are built into a film by laminating together different polymeric materials each of which possesses one or more beneficial properties. One of the early film structures developed for high impermeability to oxygen was composed of a regenerated cellulose film coated with a vinylidene chloride copolymer which was subsequently laminated with or coated with a layer of an ethylene polymer to permit the making of hermetically sealed packages. In some later applications in which a cavity is formed in the film by a vacuum forming or a thermoforming process, film structures have been developed using biaxially oriented polyethylene terephthalate base film coated with a vinylidene chloride copolymer that is subsequently laminated or coated with a polymer of ethylene as a sealing layer. In other instances, where deeper drawn cavities are required a polyamide base layer has been substituted for the polyethylene terephthalate layer.

While polyvinylidene chloride and the copolymer of vinyl chloride and vinylidene chloride have been widely used because of their low oxygen permeability, another polymeric material has begun to attract attention because of its relatively low oxygen permeability. This material is the hydrolyzed ethylene-vinyl acetate copolymer. HEVA, an early description of which is set forth in U.S. Pat. No. 2,386,347 which was issued on Oct. 9, 1945 to John R. Roland, Jr. Films and shaped articles of HEVA were later described in U.S. Pat. No. 3,183,203 which was issued on May 11, 1965 to Yasuo Yoshimura et al, and a description of a laminate of HEVA and polyethylene is found in U.S. Pat. No. 3,540,962 which issued on Nov. 17, 1970 to Haruyoshi Anzawa et al. Still another example of a prior art laminate having a HEVA layer is found in U.S. Pat. No. 3,595,740 which was issued to Clare W. Gerow on July 27, 1971 where a laminate having a barrier layer of HEVA, an outer layer of a base thermoplastic polymer, and a heat sealing layer of an ethylene polymer is described as being suitable for deeply drawn thermoformed packages. However, none of the prior art discloses a multi-layer structure with a HEVA layer that has been stretched and oriented to become a relatively thin, flexible oriented packaging material. Accordingly, it is one object of the present invention to provide an oriented, flexible, multi-layer film having a layer of HEVA.

In the flexible film category, vinylidene chloride copolymers have also been widely used and have met with commercial success in making high abuse resistant multi-layer films with low oxygen permeability. One example of a film of this type is disclosed in U.S. Pat. No. 3,741,253 which issued on June 26, 1975 to Harri J. Brax et al. While film structures having a vinylidene chloride copolymer layer do provide generally satisfactory oxygen permeability and shrinkage, it is an object of the present invention to provide an alternate shrinkable material with oxygen barrier characteristics equal to and superior to the presently used vinylidene chloride copolymers.

One problem often encountered in prior art manufacturing processes for heat shrinkable, multi-layer film is that even with great care very small quantities of air can be entrapped between layers; and, when the film is stretched for orientation these small air bubbles are also stretched so that the area they cover is enlarged thereby not only detracting from the appearance of the film but providing focal points from which layer separation can occur. Accordingly, it is another object of the present invention to provide a process in which the problem of air entrapment between the layers of a multi-ply film structure is either eliminated or minimized.

In the prior art it is generally known that olefin polymers which have been cross-linked exhibit improved abuse resistance. Also, one of the successful commercial processes for cross-linking olefin polymers is by irradiation of the polymer with ionizing radiation. However, even though film laminates having a vinylidene chloride copolymer layer have been irradiated, such irradiation is not generally practiced as the vinylidene chloride copolymer may, in some instances, degrade and discolor when subjected to high dosages of radiation. Thus, in the prior art it is the usual practice to prepare and irradiate the substrate material before applying the vinylidene chloride coating with the result that only one layer of the film structure would be crosslinked. Therefore, another object of the present invention is to provide a process for making a heat shrinkable multi-layer film with an oxygen impermeable layer in which more than one layer of the film may be cross-linked.

In order for vinylidene chloride polymers and copolymers to be successfully extruded and worked as films and constituents of film structures, it has been found necessary in the prior art to include plasticizers and stabilizers in the vinylidene chloride extrudate. While the plasticizers achieve their purpose of making the film more workable they have the undesirable quality of increasing the oxygen permeability of the film. Accordingly, it is another object of the present invention to provide a multi-layer film with low oxygen permeability which does not require the use of plasticizers.

Still another object of the present invention is to provide a heat shrinkable film with a HEVA layer, a multi-layer film not previously available.

The foregoing and other objects are achieved by applicants' surprising discovery which is set forth in the Summary of Invention below.

SUMMARY OF THE INVENTION

In one aspect, the present invention is a multi-layer film comprising a layer of HEVA having a minimum heat shrinkage of about 10% at 195° F. in at least one direction. In another aspect, the present invention is a multi-layer film comprising a HEVA layer and at least one cross-linked polymeric layer.

In yet another aspect, the present invention is a method of producing an oriented packaging film having low oxygen permeability comprising the steps of forming a polymeric multi-layer structure comprising a HEVA layer between two other polymeric layers, at least one of which comprises a cross-linked material; heating said structure to the orientation temperature of said cross-linked material; and, stretching said structure while so heated to produce a multi-layer, oriented film.

DEFINITIONS

As stated above, the hydrolyzed ethylene-vinyl acetate copolymer is designated herein as "HEVA".

Radiation dosages are referred to herein in terms of the radiation unit, "rad", with one million rads or a mergarad being designated as "MR". The degree of molecular cross-linking is expressed in terms of the radiation dosage that induces the cross-linking.

"Radiation" as used herein generally means ionizing radiation such as X-rays, gamma rays, and electrons which directly induce molecular cross-linking. (However, when used in conjunction with cross-linking agents dispersed within a material, both heat and light can be considered forms of radiant energy which induce cross-linking.) Electrons are the preferred form of radiant energy and are preferably produced by commercially available accelerators in the range of 0.5 to 2.0 mev.

The word "polymer" as used herein includes not only homopolymers but copolymers including block and graft, interpolymers, and terpolymers.

Olefin polymer or polymers as used herein includes not only polymers of the unsaturated hydrocarbons of the general formula $C_n H_{2n}$ but copolymers of olefins with other monomers such as ethylene with vinyl acetate.

PREFERRED EMBODIMENT

In the preferred embodiment of the subject invention, the multi-layer film structure is prepared by coextrusion. As the terms coextrusion is used herein it means a single extrusion process that combines two or more extrudable materials such as thermoplastic resins, waxes, adhesives, etc. in a molten state into a composite film which is self supporting. The invention includes coextruding at least two extrudable materials in either flat streams or in coaxial, annular streams. Each stream which comprises a distinct extrudable polymer will originate from a different extruder and it is preferred in the present invention to use the coextrusion process in which the layers are coextruded annularly. A coextrusion die which can perform such a process is shown in U.S. Pat. No. 3,802,826 which issued to Daniel R. St. Eve on Apr. 9, 1974. A process of coextruding a flat film is shown in U.S. Pat. No. 3,865,665 which issued on Feb. 11, 1975 to George J. Marion.

In the preferred coextrusion process, the extrudate streams are joined at or prior to the die lip thereby eliminating air that could possibly be trapped between layers. In conventional extrusion lamination, minute voids or air spaces between layers will be stretched into larger voids if the laminate is subsequently stretched to film thickness; and, if heat is applied to the laminate in conjunction with a stretching process, the heat will cause the air trapped in the void to expand thus producing a bubble which makes the resultant film unsightly as well as presenting an already delaminated area from which further layer separation can propagate. Also, in the preferred embodiment, coextrusion of the HEVA layer between two adjacent layers keeps moisture away from the HEVA layer whose oxygen permeability is adversely affected by moisture.

In the preferred process, three adjacent, annular layers of polymeric material are coextruded to form a tubular multi-layer structure and the intercalary layer comprises HEVA and at least one of the other two layers comprises a polymer which can be cross-linked by ionizing radiation. It is preferred that the HEVA be hydrolyzed to at least 50% with the most preferred degree of hydrolysis being greater than 99%. Also, the mole percent of vinyl acetate prior to hydrolysis should be at least 35%, it having been found that if the mole percent is lower than 35% the hydrolyzed copolymer is not an effective oxygen barrier.

Preferred polymers which can be cross-linked by radiation are the polyolefins, particularly polyethylene and ethylene-vinyl acetate copolymer. When the ethylene-vinyl acetate copolymer is used as one of the cross-linkable layers in the present invention, the vinyl acetate content of the copolymer, if unblended, may be up to approximately 15% with the preferred range being in the range of 3% to 12% by weight. The ethylene-vinyl acetate copolymer may be blended with polyethylene to achieve an effective vinyl acetate content as desired.

In addition to the olefin polymers, other polymer materials which may be included as layers in the multi-layer film of the present invention include, but are not limited to, polyvinyl chloride, polyamides, ionomers, acrylics, polyesters, polycarbonates, polystyrene, vinylidene chloride and copolymers thereof.

After the multi-layer, tubular structure is prepared by coextrusion, it is allowed to cool and then is flattened. The flattened tubular structure is sometimes referred to as a "tape" and in its flattened state will range from about 1 inch to 10 inches wide depending on the desired final width of the film.

The preferred method of cross-linking is by irradiation with ionizing radiation. Accordingly, or next, in the preferred process, the flattened tape is irradiated by passing it through an electron beam emanating from an electron accelerator. In a typical accelerator, the beam will be scanned across the width of the tubing and the tubing will be passed and repassed through the beam until the desired radiation dosage is obtained. The electrons will generally be in the energy range of 0.5 to 2.0 mev., and it has been found that for the present invention the preferred dosage level is in the range of 2.0 to 12.0 megarad (MR). Of course, any ionizing radiation which will induce any cross-linking between the long chain molecules of the olefin polymers is suitable. The cross-linking step is a crucial one as it has been found that when the irradiation dosage is less than about 3.0 MR for the preferred ethylene-vinyl acetate copolymer, the tubing cannot be successfully oriented by the bubble technique because there is insufficient strength in the structure to support a bubble without breaking. The dosage required to sufficiently strengthen the multilayer structure will vary according to the molecule weight, density, and constituents of the cross-linkable material and will be as low as 2.0 MR for some structures such as polyethylene. On the other hand, at dosage levels greater than 12 MR most ethylene-vinyl acetate copolymers become cross-linked to such an extent that they become stiff and difficult to work with. Thus, for most structures it has been found that the optimum dosage level range is between 4 and 8 MR. After the irradiation stage in the process, a multi-layer structure comprising a HEVA layer between two other polymeric layers at least one of which comprises a cross-linked material has been formed.

After the flattened tape has been irradiated to cross-link it to the desired extent, the tubing is heated and then inflated to a temperature range below the crystalline melting point of the cross-linked layer or layers as the case may be. This range is the orientation temperature range where the material exhibits elasticity but the molecules within the material will tend to orient in the direction the material is stretched. A preferred medium for heating the flattened tape is water at or near its boiling point when the cross-linked material is an olefin polymer. It is well known that oriented thermoplastic materials will, in general, shrink at or near the temperature at which they were oriented. Since water is readily available and is relatively safe and efficient heat transfer medium, it is commercially advantageous to produce a film structure which will be heat shrinkable in hot or boiling water. The preferred film according to the present invention possesses this desirable quality.

After the flattened tubing has expanded into a bubble it is cooled, flattened, and wound up for storage. A description of orientation by the bubble technique can be found in U.S. Pat. No. 3,022,543 which issued to W. G. Baird, Jr., et al. on Feb. 27, 1962. Depending upon the desired orientation, film width, and film thickness, tubing which has been expanded from a 1 inch to 10 inches lay flat width will have an expanded lay flat width in the range from 3 ½ to 36 inches. These, of course, are not limiting widths but are presented for illustration purposes.

By regulating the orientation temperature and the pressure used to inflate the tubing the degree of orientation or stretching can be controlled as desired. As a practical matter, the tubing will be stretched at least 10% in one direction in order to give the resulting film useful heat shrinking capabilities.

The flattened expanded tubing may be longitudinally slit to form roll film, or it may be transversely heat sealed and then severed at intervals either transversely or longitudinally to produce bags as desired. Another of the advantages of the structure according to the present invention is that it is heat sealable and permits the making of bags from the tubing or the making of pouches from sealing sheets of the film together. In addition to possessing the commercially desirable qualities of being heat sealable and being heat shrinkable in hot or boiling water, the multi-layer films according to the present invention have oxygen transmission rates of less than 30.0 cc/m², 24hrs., atm. at 73° F as measured according to the procedures of ASTM Method D 1434 and generally will have transmission rates below 5 cc/m², 24 hrs., atm. at 73° F with rates below 2.0 cc/m², 24 hrs., atm. not being uncommon. Also, tear resistance and impact resistance are excellent making the multi-layer film quite suitable for packaging food products such as meat having bones therein which may have a tendency to cut or tear the film.

Furthermore, the films according to the present invention exhibit excellent resistance to delamination and while the present invention is not to be limited to any particular theory concerning why the multi-layer film of the present invention exhibits its superior resistance to delamination, it is believed that by irradiating the laminated structure some measure of cross-linking across the interfaces of the various layers occurs. The molecules in the constituent layers of the present film are known to cross-link, and when the layers have been melt joined in the coextrusion process there is a measure of intermingling of the melts at the layer interfaces. Thus, it is theorized that molecules from one layer are cross-linked with those in an adjacent layer. In addition, the irradiation of the entire multi-layer structure rather than only a substrate layer, as is the prior art practice, promotes more uniform characteristics throughout all layers and improves adhesion between the layers.

EXAMPLE (1)

A four inch tape was produced by the coextrusion process described above wherein the tape cross section was as follows:

14 mils ethylene-vinyl acetate/2.0 mils HEVA/4.5 mils ethylene-vinyl acetate. The vinyl acetate content in the ethylene-vinyl acetate copolymer in this coextruded laminate was in the range of 3.5 to 5% by weight and the melt flow was 0.5 as determined by ASTM Method D 1238, Condition E. The HEVA was 99% hydrolyzed ethylene-vinyl acetate copolymer having 69 mole percent vinyl acetate. The temperature of all three extrudates exiting the dies was approximately 425° F. The tape was cooled and when flattened had a width of 4 inches. This tape was passed twice through the scanned beam of a 0.5 MEV insulated core transformer electron accelerator where it received a total dosage of 6.5 MR. After irradiation, the flattened tape was passed through boiling water, inflated into a bubble, and oriented into 16 inch diameter lay flat width tubing having a total thickness of 2.3 mil. The bubble was extremely stable and the appearance of the film was good. The resulting film had a 22% free shrinkage in the longitudinal direction and a 32% free shrinkage in the transverse direction at 195° F. Free shrinkage is determined by ASTM Method D 2732.

The shrink tensions at the 195° F temperature were 311 psi in the longitudinal direction and 629 psi in the transverse direction as measured by ASTM Method D 2838.

Bags were made from the oriented tubing of this example by making a transverse heat seal across the width of the tubing and then severing the tubing parallel to and immediately behind the seal. Beef steaks were inserted into the bags, air was withdrawn from the package, closed with a metal clip, and then the bag was shrunk tightly around the steaks by placing the completed package briefly in a hot water bath maintained in the range of 190° F to 210° F. The package was then immediately chilled to 34° F and stored at that temperature for four weeks with the color of the steak being evaluated periodically. After storage, the steaks had an adequate color retention and were removed from the package, allowed to bloom 30 minutes in air to regain their bright red appearance, and next placed in trays and overwrapped, and then put into a display case. After four days in the display case, beef steaks still had acceptable color. Thus, the color retention that the steak had at the end of the four week period demonstrated the low oxygen permeability of the film and its usefulness as a shrinkable packaging material.

EXAMPLES (2) and (3)

Extruder conditions similar to Example 1 were employed to produce a coextruded 4 ½ inches lay flat width tape having inner and outer layers of ethylene-vinyl acetate copolymer having 3 ½% vinyl acetate units by weight and a melt flow of 0.5 at Condition E. The thickness of the layers was as follows: 17 mils ethylene-vinyl acetate copolymer/2.25 mils HEVA/5.5 mils ethylene-vinyl acetate copolymer. An unirradiated tape would not expand into a bubble without breaking. Bubbles could be produced with inflated tubing which had been irradiated to dosage levels in the 3 to 6 MR range and satisfactory continuous production could be maintained with tape irradiated to a dosage level of 7.5 MR. Another tape sample irradiated to a 9.5 MR dosage level also produced satisfactory continuous film production. Increasing the dosage beyond the 9.5 MR level was not attempted since past experience with other ethylene-vinyl acetate copolymer laminates has shown that at dosage levels much beyond the 12 MR range the material becomes stiff and difficult to orient and seal.

The table below summarizes the characteristics of the film laminates of Examples 2 and 3:

|  | EXAMPLE 2 | EXAMPLE 3 |
| --- | --- | --- |
| Irradiation Dosage (MR) | 7.5 | 9.5 |
| Total gauge (thickness in mils) | 2.3 | 2.3 |
| Shrink Energy at 195° F* | | |
| Transverse: (p.s.i.) | 274 | 252 |
| Longitudinal: (p.s.i.) | 510 | 569 |
| Shrink Percent at 195° F | | |
| Transverse: | 22 | 23 |
| Longitudinal: | 34 | 34 |
| Oxygen Transmission (73° F) (cc/m², 24 hrs, atm.) | 1.4 | 1.6 |
| Tear Resistance (gms.) | | |
| Longitudinal: | 27.38 | 20.38 |
| Transverse: | 11.75 | 8.30 |
| Impact Resistance (cm-kg) | 25.8 | 28.0 |

Packages of beef steak were made using the multi-ply film of Examples 2 and 3 the same as were made from the film of Example 1. The HEVA layer in Examples 1, 2, and 3 had respective thicknesses of 0.20, 0.225, and 0.225 mils. In the test with the films of all three examples, satisfactory color retention and storage lifetime was achieved.

EXAMPLE (4)

Using the same coextrusion process as above, a tape was prepared in which the substrate or inner layer was a blend of 75% ethylene-vinyl acetate copolymer having 3 1/2% vinyl acetate units and 25% of an ethylene-vinyl acetate copolymer having 9% vinyl acetate units. The thickness of this innermost layer was 16 mils. The middle layer was HEVA having a thickness of 2 mils. The outermost layer comprised the same blend as for the inner layer and the thickness of the outer layer was 6 mils. The layflat width of the tubing was 4 3/16 inches and the flattened tubing was irradiated to a dosage of approximately 7.5 MR. The tubing was oriented out of a boiling water bath with the resulting oriented tubing being 16 inches in diameter and having a gauge in the range of 2.0 to 2.5 mils.

EXAMPLE (5)

According to the method set out above, a tape was coextruded having the following wall cross-section: 15 mils ethylene-vinyl acetate copolymer having 9% vinyl acetate units/2.5 mils HEVA/9 mils ethylene-vinyl acetate copolymer having 3 1/2% vinyl acetate. The flattened tape was 4 ⅜ inches wide and was irradiated to a dosage level of approximately 6.5 MR after which the inflated tape was oriented by the trapped bubble technique from a hot water bath maintained at 210° F. The resulting tubing had a layflat width of 14 inches but difficulty was encountered in that the inner layer of ethylene-vinyl acetate copolymer having 9% vinyl acetate had a tendency to stick and weld to itself.

EXAMPLES (6) and (7)

In the foregoing examples the HEVA can be characterized as having a low melt flow i.e., a melt flow of about 6.0 as determined by ASTM Method D 1238 Condition L. In Examples (6) and (7) a high flow HEVA was used the melt flow being about 19.0 at Condition L. The melt flow change is due to increased ethylene content in the copolymer. Melt flow is determined by ASTM Method D 1238.

For Examples (6) and (7), ethylene-vinyl acetate copolymer comprised the innermost and outermost layers with the vinyl acetate content being 3 1/2% by weight in Example (6) and 9% by weight in Example (7). In both examples a high melt flow HEVA layer was interposed between the ethylene-vinyl acetate layers.

Tape having an innermost layer of ethylene-vinyl acetate copolymer with a thickness in the range of about 16 mils; a sandwiched layer of high melt flow HEVA having a thickness of about 2 mils; and an outermost layer of ethylene-vinyl acetate copolymer having a thickness of 6 mils was coextruded according to the process used in the foregoing examples. The flattened tape width was 4 3/16 inches and this flattened tape was irradiated to a dosage level of approximately 7.5 MR. The tape was then preheated and oriented from boiling water in Example (6) and hot water at 200° F in Example (7), by the trapped bubble technique. The lay flat width of the tubular film was 16 ¼ inches and the thickness ranged from 1.8 to 2.5 mils. No extrusion or orientation problems were encountered.

EXAMPLE (8)

Using a coextrusion process similar to that of Example (1), a tape was coextruded having the following cross-sectional structure and thickness: 12 mils low density polyethylene/1.5 mils HEVA/10 mils low density polyethylene. This tape was flattened to a 4 inch tape and subsequently irradiated to a dosage of approximately 8.5 MR. Afterwards, the irradiated tape was preheated and oriented from a boiling hot water bath. The final tubing gauge was in the range of 2.2 to 2.8 mils, and the film had a free shrink of 26% in the longitudinal direction and 36% in the transverse direction at 195° F.

The foregoing examples demonstrate that a shrinkable multi-layer film having a HEVA layer can be successfully manufactured and such was not the case in the prior art. All the films produced in Examples (1) to (8) had oxygen permeabilities of less than 5.0 cc/m², 24 hrs. atm. at 73° F and free heat shrinkage of more than 10% in at least one direction. The multi-layered films according to the present invention were all prepared without the use of plasticizers and stabilizers which must be used for commercial prior art heat shrinkable films with very low oxygen permeabilities.

FIRST ALTERNATE EMBODIMENT

A first alternate method for producing the multi-layer, heat shrinkable film of the present invention is to employ extrusion coating or coextrusion coating. In this alternate method, a tubular cross-linked substrate is first prepared by extruding the tape, flattening it, and then irradiating it with ionizing radiation to induce the molecular cross-linking. Preferred substrate materials are olefin polymers such as polyethylene and ethylene-vinyl acetate copolymer having up to 15% vinyl acetate units. After irradiation, the substrate is inflated, but not stretched, and then passed through a coating die. This technique and a suitable coating die is described in U.S. Pat. No. 3,607,505 which issued to Henry G. Schirmer on Sept. 21, 1971. When passed through the coating die, the tubular substrate receives a coating of HEVA and is then passed through a second coating die where another polymer coating is received. The second polymeric coating is preferably an olefin polymer such as a blend of polybutene-1 and ethylene-propylene copolymer as described in U.S. Pat. No. 3,891,008 which issued to Donald J. d'Entremont on June 24, 1975. After the second polymeric coating is applied the multi-layer tubing is then a three-layer structure having a HEVA layer and a cross-linked polymeric layer. This tubular structure is then cooled and flattened, heated to the orientation temperature of the substrate, which, for polyolefin substrates will be in the range of 180° F to 250° F; and inflated to orient it by the bubble technique.

Rather than use sequential extrusion coating as described immediately above, coextrusion coating may be employed wherein two or more layers are coextruded onto a tubular, cross-linked substrate. The tubular substrate is passed through a coextrusion die and preferably the layer applied directly to the substrate is the HEVA layer and the outermost layer is an olefin polymer layer. As desired, three, four, five or more plies may be coextrusion coated onto a substrate and the substrate may have single or multiple layers. In addition, sequential coextrusion coating may be employed to build the desired multi-layer structure and additional HEVA layers employed in the structure. After such a multi-layer structure is constructed, it is then oriented by the bubble technique as before.

EXAMPLE (9)

A tubular substrate of ethylene-vinyl acetate copolymer having 9% vinyl acetate units was extruded, cooled, flattened, and irradiated by electrons from an accelerator to a dosage of approximately 5.0 MR. The substrate walls were approximately 18 mils thick. The substrate was then inflated, but not stretched, and passed through a coextrusion die where simultaneously a coating of 0.8 mil thick HEVA and a coating of a 4 mil thick polymer blend comprising 75% by weight of ethylene-propylene copolymer and 25% by weight of polybutane-1 was applied. The ethylene content in the copolymer was approximately 3.1%. The resulting multi-layer tubing had a layflat width of 4 ½ inches. Using the trapped bubble technique as described above, the tubing was expanded into oriented film having a layflat width of 17 inches from a bath of hot water maintained in the range of 210°–212° F.

SECOND ALTERNATE EMBODIMENT

The preferred method of cross-linking the layers of the multi-layer film of the present invention is by radiation induced cross-linking as described above, but chemical cross-linking can also be employed. Preferred cross-linking agents for the polyolefins are the peroxides and one which is particularly suitable for polyethylene is 2,5-dimethyl-2,5-di(t-butylperoxy) hexane as described in U.S. Pat. No. 3,201,503 which issued on Aug. 17, 1965 to Calvin J. Benning et al.

In this alternate process, the peroxide is incorporated in the extruder blend with low density (0.92 gm./cc) polyethylene so that the peroxide weight percentage is about 0.75. The blend is charged into an extruder to prepare the substrate as in the first alternate embodiment. However, care must be taken in controlling the temperature in the extruder so that it is 300° F or below in order to forestall premature cross-linking in the extruder barrel or in the die. As the tape leaves the die its wall cross-sectional thickness will preferably be in the range from 14 to 16 mils.

In order to cure or cross-link the tape, it is inflated but not expanded and passed through a furnace maintained at about 500° F where relatively rapid cross-linking is triggered by the elevated temperature. After cross-linking is completed, the tubing may be sequentially extrusion coated or coextrusion coated as described under the First Alternate Embodiment to add a HEVA layer. After coating, the tape is then passed through a hot water bath, inflated, and oriented as before.

In addition to the chemical cross-linking process set forth above, photo-sensitive cross-linking agents can be incorporated in the polymeric layers and upon exposure to ultra-violet light cross-linking is induced.

While the preferred methods of making the multi-layer film of the present invention involve the construction of a multi-layer structure in tubular form with annular layers, it is also within the scope of the present invention to extrude the polymeric and HEVA layers from slot dies either by coextruding three or more layers or by extrusion coating one layer upon another. After cross-linking such a multi-layer structure, preferably by irradiation, the structure is heated to its orientation temperature and then stretched by the well-known tenterframe technique to orient same.

Having thus described our novel multi-layer film and the methods for making same, we claim:

1. A multi-layer packaging film having low oxygen permeability comprising:
   a. two polymeric layers, at least one of which comprises an olefin polymer cross-linked to the equivalent of a dosage level in the range of 2 to 12 MR; and,
   b. a layer between said two polymeric layers which comprises a hydrolyzed ethylenevinyl acetate copolymer thereby defining a multi-layer film having at least three layers, said film having at least 10% heat shrinkage in both longitudinal and transverse directions at 195° F.

2. The film of claim 1 wherein both of said two polymeric layers are cross-linked to the equivalent of a dosage level in the range of 2 to 12 MR.

3. The film of claim 1 wherein said two polymeric layers each comprise an ethylene-vinyl acetate copolymer.

4. The film of claim 1 wherein said two polymeric layers each comprise polyethylene.

5. The film of claim 1 wherein said laminate has an oxygen transmission rate of less than 2.0 cc/m$^2$, 24 hrs., atm. at 73° F.

6. The film of claim 1 wherein said copolymer is hydrolyzed to at least 50%.

7. The film of claim 1 wherein said copolymer has 35 to 85 mole percent of vinyl acetate units.

8. The film of claim 1 wherein said film has a minimum free heat shrinkage of about 10% at 195° F in both the transverse and longitudinal directions.

9. The film of claim 1 having an oxygen transmission rate of less than 30.0 cc/m$^2$, 24 hrs., atm. at 73° F.

10. The film of claim 1 wherein said film is tubular.

11. The tubular film of claim 10 wherein said tube is heat sealed at one end to close same thereby forming a heat shrinkable bag.

12. A heat shrinkable multi-layer film having at least one layer which comprises a hydrolyzed ethylene vinyl acetate copolymer and a layer of crosslinked olefin polymer, said film having an oxygen transmission rate of less than 30.0 cc/m$^2$, 24 hrs., atm. at 73° F.

13. The film of claim 12 wherein said olefin polymer layer comprises ethylene-vinyl acetate copolymer.

14. The film of claim 12 wherein said olefin polymer layer comprises polyethylene.

* * * * *